Dec. 30, 1952  O. R. ANDERSON  2,623,276
VALVE SEAT PULLER
Filed June 13, 1946
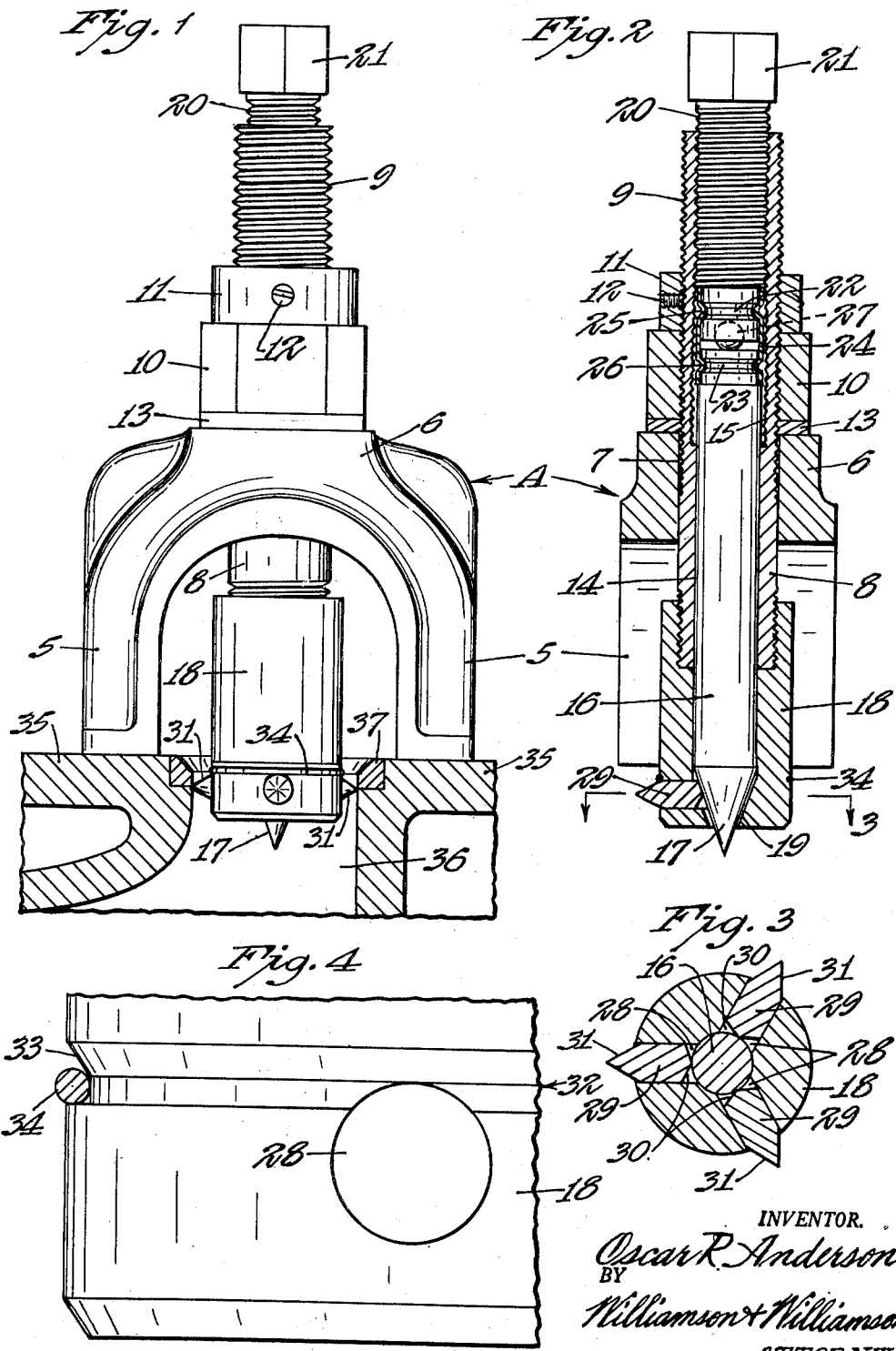
INVENTOR.
Oscar R. Anderson
BY Williamson & Williamson
ATTORNEYS Patented Dec. 30, 1952

2,623,276

UNITED STATES PATENT OFFICE 2,623,276

VALVE SEAT PULLER

Oscar R. Anderson, Minneapolis, Minn.; Annie H. Anderson administratrix of said Oscar R. Anderson, deceased Application June 13, 1946, Serial No. 676,523

4 Claims. (Cl. 29—265)

This invention relates to a valve seat puller.

It is an object of the invention to provide a valve seat puller which can be quickly placed in position to remove articles such as the hardened metal seats of valves in internal combustion engines.

It is a general object of the invention to provide a valve seat puller which can be readily applied and wherein the seat can be removed from its recess in an engine block without having to resort to prying or hammering with makeshift tools.

A more specific object of the invention is to provide a valve seat puller having a simple and effective radially slidable valve seat engaging pin with means for frictionally securing the pin in the main body of the tool.

Another object of the invention is to provide means for effectively connecting the longitudinally movable wedge element which actuates the pins and the screw element which is adapted to move the wedge into and out of engagement with the seat removing pins.

The above and other objects and advantages of the invention will more fully appear from the following description made in connection with the accompanying drawings, wherein like reference characters refer to the same parts throughout the views, and, in which:

Figure 1 is a side elevation of the tool showing a portion of an internal combustion engine in section;

Figure 2 is a longitudinal vertical sectional view through the tool;

Figure 3 is a section taken approximately on the line 3—3 of Figure 2; and

Figure 4 is an enlarged fragmentary detail of the lower portion of the device.

The tool includes a body A having downwardly extending legs 5 connected by a cross member 6. The cross member 6 is provided with a vertical opening 7 which slidably receives a sleeve 8, the upper portion of which is threaded as at 9. A nut 10 is threaded on the upper portion of the sleeve 8 and is held in position by a collar 11 secured by a set screw 12. A suitable washer 13 is interposed between the nut 10 and the cross member 6 of the body A.

The sleeve 8 is provided with a smooth bore 14 in its lower portion and a slightly larger threaded bore 15 in its upper portion. In the smaller bore 14 is a longitudinally slidable wedge member 16 having a conical lower point 17 which in its lowermost position extends into a head 18, the conical point 17 being extended partially through a lower opening 19 in said head 18. The sleeve 8 and the head 18 together constitute a shank and wherever hereinafter the term "shank" is used it is intended to include these two elements or their combined equivalent.

Threaded in the internally threaded upper portion or bore 15 of the sleeve 8 is a bolt 20 having an exposed head 21. The lower portion of the bolt 20 is provided with an annular groove 22, and the upper end of the wedge member 16 is provided with a similar groove 23. A sleeve 24 is adapted to receive the adjacent ends of the bolt 20 and wedge member 16, and said sleeve is deformed into the grooves 22 and 23 as shown at 25 and 26. Said adjacent ends of the bolt 20 and wedge member 16 are recessed to accommodate a bearing in the form of a ball 27 which keeps the adjacent ends of the above referred to members slightly spaced and provides a thrust member between them. The head 18 at the lower end of the structure is provided with a plurality of radial bores 28 which communicate with the interior of the head 18. Slidably mounted in the radial bores 28 are pins 29 having abruptly tapered inner ends 30 and sharply tapered outer ends 31. The conical point 17 of the wedge member 16 is adapted to engage the inner abruptly tapered ends of the pins 29 and when the wedge member 16 is forced downwardly by action of the bolt 20 the pins 29 will be forced outwardly.

The lower portion of the tool head 18 is provided with a circumferential groove 32, one wall of which is tapered inwardly and downwardly as shown at 33. Each of the radial bores 28 intersects a portion of the circumferential groove 32, as best shown in Figure 4, and a spring ring 34 which is seated in the groove 32 is adapted to bear against the radially movable pins 29, and by reason of the slanting wall 33 of the groove 32 the spring ring 34 is always urged into frictional engagement with said pins 29.

In Figure 1 the tool is shown in position for removing a valve seat. A portion of an internal combustion engine block is shown at 35. A valve opening 36 is provided in the engine block 35 and a portion of this opening is defined by a valve seat 37. The tool head 18 is adjusted vertically by manipulation of the nut 10 which is held normally by the collar 11 and set screw 12. The vertical adjustment of the tool head 18 is such that the pointed outer ends 31 of the pins 29 should lie at the inner section of the lower inner corner portions of the valve ring 37 and the engine block 35. When thus positioned the nut 21 is turned to move the screw 20 downwardly and force the wedge member 16 downwardly so that its conical end 17 will force the radially slidable pins outwardly thus dislodging the valve seat 37 and forcing it upwardly so that it can readily be removed. If the valve seat is tightly fitted in the engine block the large nut 10 can be turned downwardly on the threaded portion 9 of the sleeve 8 to exert an upward pull on said sleeve and the head 18 after the pins 29 are forced beneath the seat 37. The slidable pins 29 and frictional spring retaining ring 34 provide a simple and effective means for keeping the pins from dropping out of the tool, although they can be readily pushed inwardly after the wedge member 16 has been retracted upwardly.

It should be noted that my device provides a valve seat puller which has an automatic seating feature which facilitates the removal of valve seats even though these valve seats may vary substantially in depth. It is not uncommon for valve seats to have depths which vary substantially, and when this is true many of the more commonly known devices for pulling valve seats cannot be used, since they are adapted to pull a valve seat of a single depth. The operator of my device, assuming now that the valve seats to be pulled are of a uniform depth substantially greater than the depth of valve seats previously pulled, needs only to release the screw 12 and turn the collar 11 and the nut 10 upwardly. This lowers the pins 29 until the sharply tapered outer ends 31 can be positioned directly opposite the lower edge of the valve seat 37. The nut 10 is adjusted until the pins will be maintained at that level. The collar 11 is then turned down until its lower edge abuts against the upper surface of the nut 10. Thereafter, the set screw 12 is tightened to maintain the collar 11 in fixed position with respect to the threaded portion 9 of the sleeve 8. After the pins 29 have been forced outwardly by turning the bolt 20 downwardly and the valve seat 37 has been dislodged by such outward movement of the pins and the turning of the nut 10 downwardly it is a simple matter to readjust my device to insure that the pins 29 will be properly positioned for removing the next of the series of valve seats. To accomplish this, the operator merely turns the nut 10 upwardly on the sleeve 8 until its upper surface once more abuts against the lower surface of the collar 11. When this has been done and the device has been properly positioned otherwise with respect to the valve seat to be next removed, the sharpened points 31 of the pins 29 will be automatically positioned directly opposite the lower edge of the valve seat. Thus it can be seen that my device has an automatic seating feature which substantially reduces the time required normally for removing series of valve seats which vary from other series of valve seats in depth.

It will, of course, be understood that various changes may be made in the form, details, arrangement and proportions of the various parts without departing from the scope of my invention.

What I claim is:

1. In a valve seat puller, a generally U-shaped body including a pair of spaced arms lying at one side of said body, a shank unit entirely slidable through said body between the arms of the body and extending therethrough in the same general direction as said arms, one end portion of said shank unit lying between said arms and having a head thereon, said head having a circumferential groove formed therein, means on said shank unit for moving the same longitudinally and relative to said body, said shank unit moving means being located at the opposite side of said body from said arms, a plurality of spaced valve seat dislodging pins carried by said head and extending outwardly into and intersecting a portion of said groove, said pins being readily shiftable relative to said head, a pin moving device extending longitudinally through said shank unit, one end portion of said pin moving device being in engagement with the inner ends of said pins and the other end of said pin moving device extending through the opposite end of said shank unit to make it accessible for movement thereof relative to said shank unit and thereby to radially move said pins, and a retaining ring seated in said groove and frictionally engaging the outer end portions of said pins to retain the same.

2. In a valve seat puller, a forked body including a transverse portion and at least a pair of spaced arms extending therefrom to provide a bridging structure, said transverse portion having an aperture therethrough the axis of which is disposed generally in the same direction as the longitudinal axes of the arms, a sleeve extending slidably through said body and having a head on the lower end thereof and having an externally threaded upper end portion, said head having a circumferential groove formed therein, a plurality of circumferentially spaced radial pins slidably mounted in said sleeve head and extending outwardly into and intersecting a portion of said groove, a retaining ring seated in said groove and engaging across the pins to retain the pins, a nut threaded on the upper end portion of said sleeve and having a bearing against said transverse portion of said body on the side of said body opposite the said arms, a pin actuator element engaging said pins and being received within the entire length of said sleeve and threaded thereto for longitudinal movement with respect thereto to actuate said pins, and a collar threaded onto said sleeve above said nut, said collar being adapted to be moved to and fixed at abutting position with respect to said nut when said pins are at the proper level to remove one of a series of valve seats to thereby provide ready and accurate depth setting gage means for said pins for the remainder of the series.

3. In a valve seat puller, a head member having a central bore and a circumferential seat portion, said head member having a plurality of transverse bores leading from the central bore and intersecting a portion of said seat portion and spaced from each other circumferentially thereof, valve seat engaging pins longitudinally slidable in said transverse bores, a movable actuator carried by said head member in said central bore and engaging said pins to force the pins outwardly in said transverse bores and into said seat portion, means for forcibly moving said actuator to engage said pins and force the same outwardly in the transverse bores, and a retaining ring seated in said circumferential seat portion and frictionally engaging said pins as they are moved outwardly by said actuator to retain the same.

4. A valve seat puller comprising a body formed with an opening and adapted to be mounted opposite an annular valve seat with its opening in alignment with the said valve seat, a tubular sleeve slidable longitudinally through said opening, a head at the inner end of said sleeve, the sleeve and head being formed with a longitudinal bore, the head being formed with radially extending circumferentially spaced openings having inner ends communicating with the bore, the head being also formed externally with a circumferentially extending groove having a lower portion intersected by outer ends of the radially extending openings, the portion of the groove above said radially extending openings having its wall forming a shoulder extending downwardly at a steep inward incline, pins slidable longitudinally through said radial openings and having inner ends entering said bore and having pointed valve seat engaging outer ends protruding from the said radial openings and extending across the lower portion of the groove, a split resilient ring about said head seated in said groove and resting upon upper surfaces of the pointed outer ends of said pins to prevent the pins from falling out, and a wedge shiftable longitudinally through said bore and having a tapered lower end engaging inner ends of the pins and shifting the pins outwardly when moved downwardly, the pointed ends of the pins when moved outwardly expanding the ring and shifting said ring upwardly along the inclined shoulder of the groove.

OSCAR R. ANDERSON.

REFERENCES CITED

The following references are of record in the file of this patent:

UNITED STATES PATENTS

| Number | Name | Date |
| --- | --- | --- |
| 869,861 | Alspaugh | Oct. 29, 1907 |
| 1,445,001 | Campbell | Feb. 13, 1923 |
| 1,483,818 | Lloyd | Feb. 12, 1924 |
| 1,705,789 | Steirly | Mar. 19, 1929 |
| 1,964,470 | King | June 26, 1934 |
| 2,257,318 | Wilborn | Sept. 30, 1941 |
| 2,292,739 | Bradbury | Aug. 11, 1942 |
| 2,310,639 | Johnson | Feb. 9, 1943 |